United States Patent [19]

Duska et al.

[11] Patent Number: 4,626,557

[45] Date of Patent: Dec. 2, 1986

[54] PLASTIC OVENWARE CONTAINING TALC

[75] Inventors: Joseph J. Duska, Manasquan; Arnold B. Finestone, Woodcliff Lake; John B. Maher, Rockaway, all of N.J.

[73] Assignee: Dart Industries, Inc., Northbrook, Ill.

[21] Appl. No.: 726,882

[22] Filed: Apr. 24, 1985

Related U.S. Application Data

[63] Continuation of Ser. No. 401,765, Jul. 26, 1982, abandoned.

[51] Int. Cl.$^4$ ................. A47J 27/08; A47J 36/04; C08K 3/34; C08L 67/00
[52] U.S. Cl. .................................... 523/100; 524/451; 524/599
[58] Field of Search ............... 524/451, 599; 528/125, 528/128, 173, 183, 184, 190, 193, 194, 206, 271; 523/100

[56] References Cited

U.S. PATENT DOCUMENTS 4,219,629  8/1980  Storm ................................ 525/167
4,244,859  1/1981  Sugie et al. ......................... 525/64

FOREIGN PATENT DOCUMENTS

| 25985 | of 0000 | Chile . |
| 26315 | of 0000 | Chile . |
| 44175A | 1/1982 | European Pat. Off. . |
| 80/02430 | 11/1980 | PCT Int'l Appl. . |
| 2011439 | 7/1979 | United Kingdom . |
| 2058102 | 4/1981 | United Kingdom . |
| 1592204 | 7/1981 | United Kingdom . |

OTHER PUBLICATIONS

Derwent Abstract, 54101 E/26, (6-10-82) RD-218042.

*Primary Examiner*—Herbert J. Lilling
*Attorney, Agent, or Firm*—Jones & Askew

[57] ABSTRACT

Permanent ovenware capable of repeated use in both conventional thermal and microwave ovens fabricated from wholly aromatic polyester compositions and, more particularly, from oxybenzoyl polyester compositions containing up to about 60% of talc having present a minimum content of material decomposable at elevated temperatures.

28 Claims, No Drawings

PLASTIC OVENWARE CONTAINING TALC

This application is a continuation of application Ser. No. 401,765, filed July 26, 1982 and now abandoned.

BACKGROUND OF THE INVENTION

It is known that certain plastic materials have found some application in the ovenware field. For example, polymethylpentene has been used for injection molded trays which can be used in the preparation of foods. Polysulfone has also been employed in food handling applications. However, no satisfactory material has been found possessing utility over the wide ranges of conditions and of demands which are encountered in the provision of cook-in containers, or ovenware, which can be used in either thermal ovens or microwave ovens.

In addition to the obvious necessity for a material which can withstand the temperatures met in the heat source used for cooking, a material must provide a unique combination of a number of other characteristics before ovenware fabricated from the material can be successfully employed in the preparation of food. The material must have good electrical properties. It must be able to undergo severe thermal shocks in that ovenware prepared from it must be capable of going from conditions of extreme cold to high temperatures in relatively brief periods of time. The material must have good hardness and impact strength and possess high tensile and flexural strength. It must also be resistant to boiling water, food acids and fats and to adverse effects from immersion in detergents.

In the area of food related properties the material must impart to the ovenware fabricated from it resistance to staining by a wide variety of foodstuffs. It must provide a surface affording good antistick properties, ready releasability for the food which it contains. It must not emit or give off any volatile matter and it must not have any extractable constituent. And in addition to meeting all of the foregoing requirements, articles prepared from it must present a pleasing and generally uniform appearance in order to be marketable.

SUMMARY OF THE PRESENT INVENTION

Ovenware meeting the stringent demands of the cook-in container market is provided by fabricating the ovenware articles from a plastic material based upon wholly aromatic polyesters, more particularly upon oxybenzoyl polyesters.

The wholly aromatic polyesters employed in accordance with the present invention consist of combinations of repeating units of one or more of the following formulae:

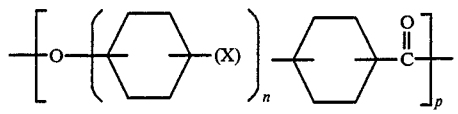

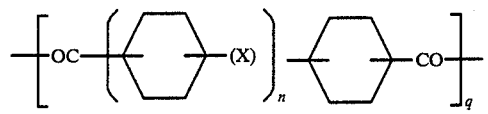

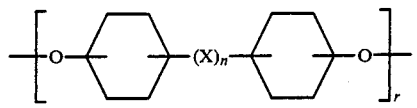

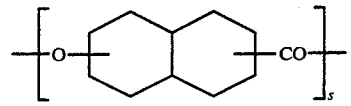

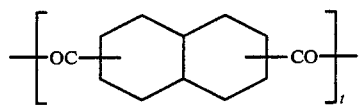

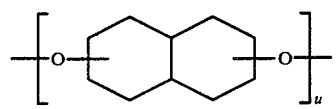

where x is O, S,

NH, or $SO_2$ and n is 0 or 1 and the total of the integers $p+q+r+s+t+u$ in the moieties present in from about 3 to about 800.

Combinations of the above units include union of the carbonyl group of Formulae I, II, IV and V with the oxy group of Formulae I, III, IV and VI. In the most general combination all units of the above formulae can be present in a single copolymer. The simplest embodiment would be homopolymers of units I or IV. Other combinations include mixtures of units II and III, II and VI, III and V, V and VI, and I and IV.

The location of the functional groups are preferably in the para, (1,4) positions. They can also be located in ortho (1,2) position to each other. With respect to the naphthalene moiety, the most desirable locations of the functional groups are 1,4; 1,5 and 2,6. Such groups can also be in the ortho position to each other.

The symbols p, q, r, s, t and u are integers and indicate the number of moieties present in the polymer. The total $(p+q+r+s+t+u)$ can vary from 3 to 800 and, when present, the ratio of q/r, q/u, t/r, t/u, q+t/r, q+t/r+u and t/r+u can vary from about 10/11 to about 11/10 with the most preferable ratio being 10/10.

Exemplary of materials from which the moieties of Formula I may be obtained are p-hydroxybenzoic acid and esters such as phenyl-p-hydroxybenzoate, p-acetoxybenzoic acid and isobutyl-p-acetoxybenzoate. Those from which the moiety of Formula II is derivable include terephthalic acid, isophthalic acid, diphenyl terephthalate, diethyl isophthalate, methylethyl terephthalate and the isobutyl half ester of terephthalic acid. Among the compounds from which the moiety of Formula III results are p,p'-biphenol; 4,4'-dihydroxybenzophenone; resorcinol and hydroquinone. Inspection will show which of these materials are also suitable for supplying the moieties of Formulae VI–VIII.

Examples of monomers represented by Formula IV are 2-hydroxy-6-naphthoic acid; 6-hydroxy-1-naphthoic acid, 5-acetoxy-1-naphthoic acid and phenyl 5-hydroxy-1-naphthoate. Monomers representing Formula V include 1,4-naphthalenedicarboxylic acid; 1,5-naphthalendicarboxylic acid and 2,6-naphthalenedicarboxylic acid. The diphenyl esters of dicarbonyl chlorides of these acids can also be used. Examples of monomers representative of Formula VI are 1,4-dihydroxynaphthalene; 2,6-diacetoxynaphthalene and 1,5-dihydroxynaphthalene.

Particularly preferred for use in the practice of the present invention are plastic materials based upon oxybenzoyl polyesters.

A preferred class of oxybenzoyl polyesters are copolyesters of recurring units of Formulae VIII and IX:

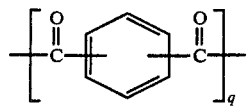
(VIII)

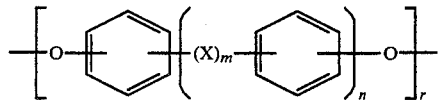
(IX)

wherein x is —O or —SO$_2$—; m is 0 or 1; n is 0 or 1; q:r=10:15 to 15:10; p:q=1:100 to 100:1; p+q+r=3 to 600 and preferably 20 to 200. The carbonyl groups of the moiety of Formula I or III are linked to the oxy groups of a moiety of Formula I or IV; the oxy groups of the moiety of Formula I or IV are linked to the carbonyl groups of the moiety of Formula I or III.

Another group of aromatic polyesters which can be employed are the aromatic polyesters containing recurring units of the 2,6-dicarboxynaphthalene moiety and-/or the p-oxybenzoyl moiety and symmetrical dioxy aryl moiety, and variations thereof. Such polyesters are disclosed in U.S. Pat. Nos. 4,067,852; 4,083,829; 4,130,545; 4,161,470; 4,184,996; 4,219,461; 4,224,433; 4,238,598; 4,238,599; 4,256,624; 4,265,802; 4,279,803, 4,318,841 and 4,318,842.

The preferred copolyesters are those of recurring units of Formula X:

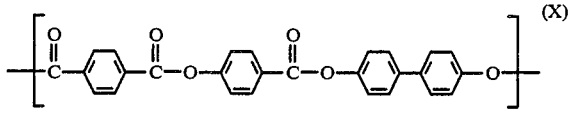
(X)

The synthesis of these polyesters is described in detail in U.S. Pat. No. 3,637,595, entitled "P-Oxybenzoyl Copolyesters", the disclosure of which is incorporated herein by reference.

The polyesters useful in the present invention can also be chemically modified by various means such as by inclusion in the polyester of monofunctional reactants such as benzoic acid or tri- or higher functional reactants such as trimesic acid. The benzene rings in these polyesters are preferably unsubstituted but can be substituted with non-interfering substituents.

The oxybenzoyl polyesters useful in the present invention can be employed with various fillers of types and in amounts which either promote or at a minimum do not materially affect the desired properties. Examples of suitable fillers include among other glass fibers, milled glass, polytetrafluoroethylene, pigments and fillers and combinations thereof.

While the ovenware prepared from compositions comprising the oxybenzoyl polyesters and the various fillers recited above meet most of the general requirements recited earlier, they do not have the uniform, pleasing appearance necessary to a commercially marketable product. In addition, it has been observed that many of the fillers create excess bubbling in the ovenware products at elevated temperatures.

It has been found in accordance with the present invention that a uniform and pleasing appearance can be imparted to the ovenware articles and the undesirable bubbling suppressed or minimized by the inclusion in the oxybenzoyl compositions from which they are molded of talc which contains a minimum amount of materials decomposable at elevated temperatures, e.g. up to about 800° C., such as magnesium carbonate. Among such talcs are talcs which are of high purity, are selectively combined from various ores or have been calcined or subjected to acid treatment.

These talcs which are employed according to the present invention are characterized by a low weight loss on ignition, a low iron content analyzed as iron oxide and a closely controlled particle size.

The weight loss on ignition of the suitable talcs is not more than 6% or less at 950° C. and is 2% or less at 800° C. The iron content analyzed as iron oxide (Fe$_2$O$_3$) will be not more than about 1% and that of the particularly preferred talcs will be not more than about 0.6% and may be less.

Experiments and tests carried out have demonstrated quite conclusively that it is essential to use such talc in order to realize the objectives of the present invention. The use of other forms of talc do not provide satisfactory properties in the finished molded product. However, such other forms of talc can be employed in conjunction with the specified talcs in amounts of from about 0.05% to about 20% of the required forms of talc.

The talcs containing the minimum amount of decomposable material will be present in amounts of from about 1% to about 60% based on the total composition weight with the preferred range being from about 35% to about 55%.

Rutile titanium dioxide can also be employed in conjunction with the talc material, including mixtures of highly refined talcs and other talc. The rutile titanium dioxide will be present in a proportion of from about 2% to about 20% based on the weight of the total composition. The preferred range is from about 5% to about 15%.

In the molding compositions of the present invention, the resin will generally comprise from about 35% to about 85% and the total inerts from about 65% to about 15%. For optimum results, the inerts will comprise from about 40% to about 55% of the molding compositions. The inerts will comprise up to about 55% of highly refined talc and from about 0 to about 10% of titanium dioxide.

While all of the resins hereinbefore described are suitable for use in the present invention, it is preferred to employ the resin in which the dibasic acid, the hydroxy aromatic acid and the aromatic diol are present in the molar proportions of about 1:2:1. Other molar proportions can be employed and resins have been used in which the molar proportions of, illustratively, terephthalic acid, p-hydroxybenzoic acid and biphenol are 1:3:1, 1:5:1, 1:7:1 and 1:3.5:1. Physical blends of resins in which various proportions of reactants have been employed are also suitable for use.

The composition of the present invention can be prepared by extrusion in accordance with generally known practice. For example, a twin screw extruder can be employed with addition of the polymer, selected talc and titanium dioxide at the feed throat and with addition of the glass roving at both the vent and feed throat.

The compositions so prepared can then be injection molded according to general practice using techniques familiar to the injection molding field.

The invention is further illustrated by the following examples in which all parts and percentages are by weight unless otherwise indicated. These nonlimiting examples are illustrative of certain embodiments designed to teach those skilled in the art how to practice the invention and to represent the best mode contemplated for carrying out the invention.

EXAMPLE 1

This example illustrates the synthesis of a copolyester useful in the present invention.

The following quantities of the following ingredients are combined as indicated.

| Item | Ingredient | Quantity | |
|---|---|---|---|
| | | Grams | Moles |
| A | P—hydroxybenzoic Acid | 138 | 1 |
| B | Phenyl Acetate | 170 | 1.25 |
| C | Therminol 77 | 500 | — |
| D | Diphenyl Terephthalate | 318 | 1 |
| E | Hydrogen Chloride | — | — |
| F | Hydroquinone | 111 | 1.01 |
| G | Therminol 77 | 500 | — |

Items A-D are charged to a four-necked, round bottom flask fitted with a thermometer, a stirrer, a combined nitrogen and HCl inlet and an outlet connected to a condenser. Nitrogen is passed slowly through the inlet. The flask and its contents are heated to 180° C. whereupon HCl is bubbled through the reaction mixture. The outlet head temperature is kept at 110°-120° C. by external heating during the p-hydroxybenzoic acid, phenyl acetate ester exchange reaction.

The flask and its contents are stirred at 180° C. for 6 hours whereupon the HCl is shut off, the outlet head temperature raised to 180°-190° C. and the mixture stirred at 220° C. for 3.5 hours. Up to this point, 159 grams of distillate are collected in the condenser. Item F is then added and the temperature gradually increased from 220° C. to 320° C. over a period of 10 hours (10° C./hr). Stirring is continued at 320° C. for 16 hours and then for three additional hours at 340° C. to form a slurry. The total amount of distillate, consisting of phenol, acetic acid and phenyl acetate, amounts to 384 g. Item G is added and the reaction mixture permitted to cool to 70° C. Acetone (750 ml) is added and the slurry filtered, the solids are extracted in a Soxhlet with acetone to remove items C and G. The solids are dried in vacuo at 110° C. overnight whereupon the resultant copolyester (320 g, 89.2% of theory) is recovered as a granular powder.

EXAMPLE 2

518 Parts of isophthalic acid, 1,557 parts of terephthalic acid, 5,175 parts of para-hydroxybenzoic acid, 6,885 parts of acetic anhydride and 2,325 parts of p,p'-bisphenol are mixed together and refluxed for 17 hours, at a temperature of about 180° C., after which the reflux condenser is replaced with a distilling head and the temperature is raised to 345° C. over a period of 1 and ¼ hours. The reaction mixture is stirred throughout the heating period, being particularly actively mixed during the period in which the temperature is being raised to 345° C. The yield of polymer is 8,020 parts and 8,010 parts of distillate are recovered. The contents of the reaction vessel are removed, cooled and ground to particle sizes in the 20 to 160 mesh range, U.S. Standard Sieve Series. The resin made is of a molecular weight in the 5,000–20,000 range, with an average weight in about the middle of such range. The product is estimated to be about 50% crystalline.

The resin particles are held under vacuum illustratively at an elevated temperature at an absolute pressure of about 100 mm of mercury for eight hours and recovered as a granular powder.

EXAMPLE 3

The following quantities of the following ingredients are combined as indicated.

| Item | Ingredient | Quantity | |
|---|---|---|---|
| | | Grams | Moles |
| A | Terephthalic Acid | 291 | 1.75 |
| B | P—Hydroxybenzoic Acid | 483 | 3.50 |
| C | p,p'-biphenol | 325 | 1.75 |
| D | Acetic Anhydride | 755 | 7.40 |

Items A-D are heated to 145° C. and refluxed overnight. The reflux condenser is removed and a distilling head put in place. The mixture is heated with stirring at a rate of 20° C./hour to 300° C. and the contents of the reactor removed. At this point, about 92-94% of the theoretical acetic acid is collected. The prepolymer is ground up and advanced as in Example 2, employing a temperature of about 250°-375° C.

EXAMPLE 4

| Item | Ingredient | Quantity | |
|---|---|---|---|
| | | Grams | Moles |
| A | P—Hydroxybenzoic Acid | 276.0 | (2.00) |
| B | Terephthaloyl Chloride | 203 | 1.0 |
| C | Trimesic Acid | 8.4 | 0.040 |
| D | Therminol 66 | 1274 | |
| E | p,p'-biphenol | 186 | 1.0 |
| F | Acetic Anhydride | 224.6 | 2.2 |

Items A-D are heated to 130° C. and held one hour. The reaction is exothermic and care is taken to maintain temperature at 130° C. The contents are then heated at 155° C. for one hour and 180° C. for 4 hours. The mixture is then cooled to 150° C. and item E added whereby the temperature is further reduced to 140° C. Item F is then added. This mixture is then refluxed one hour at 155° C. and the reflux condenser replaced by a distillation column. While distilling the acetic acid formed, the contents of the reactor are heated to 330° C. and held 3 hours. The suspended polymer is cooled to 250° C. and the mixture passed through a filter. The solid material is worked with trichloroethylene to remove the heat transfer fluid. The dried powder is advanced further in vacuum as in Example 2.

EXAMPLES 5, 6, AND 7

The procedure of Example 3 is repeated employing the quantities of the ingredients indicated.

| Item | Ingredient | Quantity in Moles | | |
|------|------------|-------|-------|-------|
|      |            | Ex. 5 | Ex. 6 | Ex. 7 |
| A    | Terephthalic Acid | 1 | 1 | 1 |
| B    | p-Hydroxybenzoic Acid | 3 | 4 | 5 |
| C    | p,p'-biphenol | 1 | 1 | 1 |
| D    | Acetic Anhydride |  |  |  |

EXAMPLE 8

268 Parts of biphenol, 396 parts of para-hydroxybenzoic acid, 693.40 parts of acetic anhydride and 238 parts of terephthalic acid are admixed and heated to a temperature of 315° C. over a period of 5 hours at a 30° C. per hour rate of rise for the temperature. The reaction mixture is stirred throughout the heating period. When the temperature of 315° C. is reached, the polymer contents are removed from the reaction vessel and ground to a particle size in the 20 to 200 mesh range, U.S. Standard Sieve Series. The resin particles are incrementally advanced in an oven to a temperature of 354° C. over a period of 16 hours and recovered as a granular powder.

EXAMPLE 3

A molding composition was prepared from the polymer of Example 8 by extruding a mixture of 257.5 parts of the polymer of Example 8, 30 parts of rutile titanium dioxide and 212.5 parts of a high purity talc having the platy structure of natural talc, a loss on ignition of 2% weight percent, an iron content analyzed as $Fe_2O_3$ of 0.5% and a particle size distribution in which over 95% of the particles are less than 40 microns.

The resulting blend was injection molded to provide molded bowls of a uniform, pleasing appearance which showed no cracking or blistering at minimum temperatures of about 260° C.

Certain of the molded articles were subjected to a stain test in which a dollop of barbecue sauce was placed on the bottom of the molded container. The container was then placed in a 350° F. preheated oven for one hour. At this time the sauce was thick, dark and crusty. After cooling the container was washed with soap and water using a Scrunge pad. The container was examined for stain and the color difference between stain and unstained areas noted. The difference observed was very slight.

Certain other specimens were subjected to a drop test in which five specimens were dropped on their top outside perimeter from continually increasing heights in order to determine their ability to withstand the drop impact without appreciable damage. The average for these specimens was 40 inches.

The results of these tests all indicate the suitability of the molded articles for use as cook-in containers for food.

EXAMPLE 10

A molding composition was prepared from a polymer produced in accordance with Example 8 by extruding a mixture of 271 parts of polymer and 10 parts of the talc employed in Example 9.

The resulting blend was injection molded at a screw speed of 100 rpm, an injection pressure of 2000 psi and at temperature settings of 355° C. in Zone 1, 360° C. in Zone 2 and 345° C. in Zones 3 and 4.

Molded articles of generally pleasing appearance were obtained.

EXAMPLES 11–18

In these examples, 257.5 parts of the resin products of Examples 1–8 were admixed with 202.5 parts of the talc employed in Example 9 and 40 parts of rutile titanium dioxide by passage through a twin-screw extruder. The reinforced resinous compositions obtained were shaped by injection molding. The molded articles obtained were satisfactory in appearance and in resistance to cracking and blistering at elevated temperatures.

What is claimed is:

1. A molded article of permanent ovenware, comprising at least about 35% by weight of a wholly aromatic polyester and about 1 to 60% by weight of a talc containing a minimum amount of materials decomposable at elevated temperatures characterized by a weight loss on ignition of not more than about 6% by weight at 950° C. and 2% by weight at 800° C. and having an iron content of not more than about 1.0% by weight analyzed as iron oxide, such that the ovenware is not blistered or bubbled or cracked during molding or oven use.

2. The article of claim 1 wherein the talc is selected from the group consisting of high purity talc, highly refined talc, calcined talc and acid-treated talc.

3. The article of claim 1 comprising about 35 to 55% by weight of said talc.

4. The article of claim 1 wherein said talc comprises a particle size distribution in which at least about 95% of the particles are less than about 40μ.

5. The article of claim 1 comprising about 2 to 20% by weight of titanium dioxide.

6. The article of claim 5 comprising about 5 to 15% by weight of titanium dioxide.

7. The article of claim 1 wherein the aromatic polyester is an oxybenzoyl polyester.

8. The article of claim 7 wherein the oxybenzoyl polyester comprises recurrent moieties selected from the following formulas:

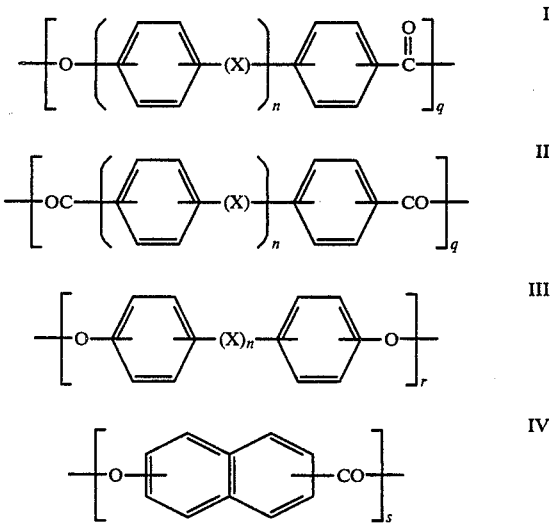

-continued

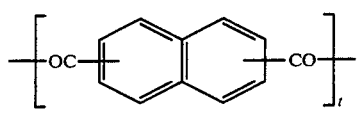

V

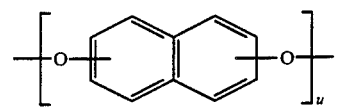

VI where X is O, S, CO, NH, or SO$_2$; n is zero or one; and p+q+r+s+t+u is about 3 to 800.

9. The article of claim 8 wherein each of the ratios q:r, q:u, t:r, t:u, (q+t):(r+u), and t:(r+u) of the moieties present is about 10:10 to 11:10.

10. The article of claim 9 wherein each of said ratios is about 10:10.

11. The article of claim 8 wherein n is zero.

12. The article of claim 7 wherein the oxybenzoyl polyester comprises recurrent moieties selected from the following formulas:

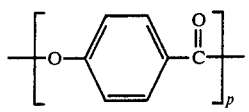

VII

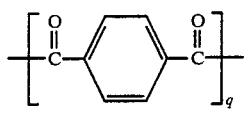

VIII

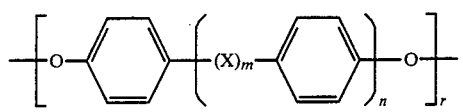

IX where X is O or SO$_2$; m is zero or one; n is zero or one; q:r is about 10:15 to 15:10; p:q is about 1:100 to 100:1; p+q+r is about 3 to 600; the carbonyl groups of the moiety of formula VII or VIII are linked to the oxy groups of the moiety formula VII or IX; and the oxy groups of the moiety of formula VII or IX are linked to the carbonyl groups of the moiety of formula VII or VIII.

13. The article of claim 7 wherein the oxybenzoyl polyester comprises recurrent units of the following formula:

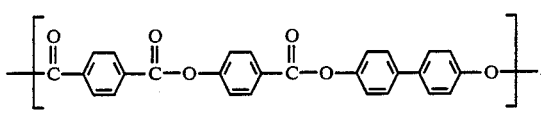

X

14. A molding composition for permanent ovenware, comprising at least about 35% by weight of a wholly aromatic polyester and about 1 to 60% by weight of a talc containing a minimum amount of materials decomposable at elevated temperatures characterized by a weight loss on ignition of not more than about 6% by weight at 950° C. and 2% by weight at 800° C. and having an iron content of not more than about 1.0% by weight analyzed as iron oxide, such that during molding at elevated temperatures said composition is not blistered or bubbled or cracked.

15. The composition of claim 14 wherein the talc is selected from the group consisting of high purity talc, highly refined talc, calcined talc and acid-treated talc.

16. The composition of claim 14 comprising about 35 to 55% by weight of said talc.

17. The article of claim 14 wherein said talc comprises a particle size distribution in which at least about 95% of the particles are less than about 40μ.

18. The composition of claim 14 comprising about 2 to 20% by weight of titanium dioxide.

19. The composition of claim 18 comprising about 5 to 15% by weight of titanium dioxide.

20. The composition of claim 14 wherein the aromatic polyester is an oxybenzoyl polyester.

21. The composition of claim 20 wherein the oxybenzoyl polyester comprises recurrent moieties selected from the following formulas:

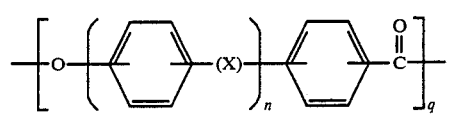

I

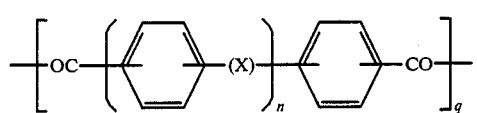

II

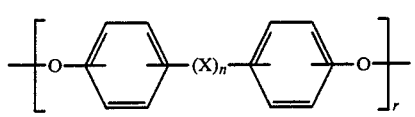

III

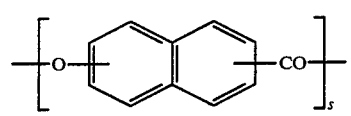

IV

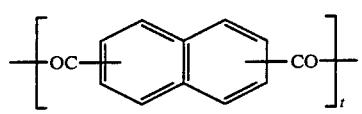

V

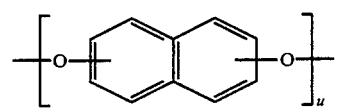

VI where X is O, S, CO, NH, or SO$_2$; n is zero or one; and p+q+r+s+t+u is about 3 to 800.

22. The composition of claim 21 wherein each of the ratios q:r, q:u, t:r, t:u, (q+t):(r+u), and t:(r+u) of the moieties present is about 10:10 to 11:10.

23. The composition of claim 22 wherein each of said ratios is about 10:10.

24. The composition of claim 21 wherein n is zero.

25. The composition of claim 20 wherein the oxybenzoyl polyester comprises recurrent moieties selected from the following formulas:

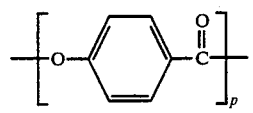

VII

-continued

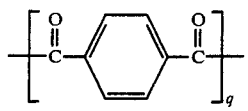

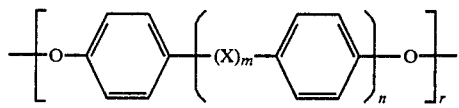

where X is O or $SO_2$; m is zero or one; n is zero or one; q:r is about 10:15 to 15:10; p:q is about 1:100 to 100:1; p+q+r is about 3 to 600; the carbonyl groups of the moiety of formula VII or VIII are linked to the oxy groups of the moiety of formula VII or IX; and the oxy groups of the moiety of formula VII or IX are linked to the carbonyl groups of the moiety of formula VII or VIII.

26. The composition of claim 20 wherein the oxybenzoyl polyester comprises recurrent units of the following formula:

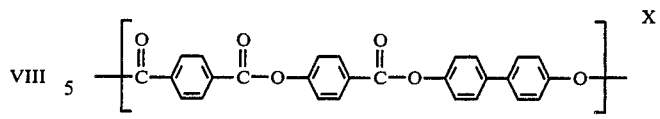

27. A molded article of nonblistering permanent ovenware comprising:
at least about 35% by weight of an oxybenzoyl polyester;
about 35 to 55% by weight of a talc, having
a minimum content of materials decomposable at elevated temperatures characterized as a weight loss on ignition of not more than about 6% by weight of 950° C. and 2% by weight at 800° C.,
an iron content of not more than about 1% by weight analyzed as iron oxide, and
a particle size distribution in which at least about 95% of the particles are less than about 40μ; and
about 2 to 20% by weight of titanium dioxide.

28. A molding composition for permanent ovenware, comprising at least about 35% to 85% by weight of a wholly aromatic polyester and about 35 to 55% by weight of a talc containing a minimum amount of materials decomposable at elevated temperatures characterized by a weight loss on ignition of not more than about 6% by weight at 950° C. and 2% by weight at 800° C., and having an iron content of not more than about 0.6% by weight analyzed as iron oxide, and about 2 to 20% by weight of titanium dioxide.

* * * * *